(12) United States Patent
Tiwari (10) Patent No.: US 12,130,729 B2
(45) Date of Patent: Oct. 29, 2024

(54) DEFECT RECREATION

(71) Applicant: Dell Products L.P., Round Rock, TX (US)

(72) Inventor: Shubhi Tiwari, Bengaluru (IN)

(73) Assignee: Dell Products L.P., Round Rock, TX (US)

( * ) Notice: Subject to any disclaimer, the term of this patent is extended or adjusted under 35 U.S.C. 154(b) by 52 days.

(21) Appl. No.: 17/862,023

(22) Filed: Jul. 11, 2022

(65) Prior Publication Data

US 2024/0012738 A1 Jan. 11, 2024

(51) Int. Cl.
*G06F 9/44* (2018.01)
*G06F 9/445* (2018.01)
*G06F 11/36* (2006.01)

(52) U.S. Cl.
CPC .............................. *G06F 11/3664* (2013.01)

(58) Field of Classification Search
CPC .................................................. G06F 11/3664
See application file for complete search history.

(56) References Cited

U.S. PATENT DOCUMENTS

| | | | |
|---|---|---|---|
| 9,946,632 B1 * | 4/2018 | Chopra | G06F 11/3672 |
| 11,188,528 B1 * | 11/2021 | Kostakis | G06F 11/0769 |
| 2016/0232021 A1 * | 8/2016 | Bucknell | G06F 9/45558 |
| 2016/0371173 A1 * | 12/2016 | Ignatyev | G06F 11/3692 |
| 2021/0064518 A1 * | 3/2021 | Abu Taha | G06F 11/3688 |
| 2021/0157716 A1 * | 5/2021 | Allen | G06F 11/3688 |
| 2021/0200950 A1 * | 7/2021 | Basu | G16H 10/60 |
| 2021/0311860 A1 * | 10/2021 | Botea | G06F 11/3688 |
| 2021/0406157 A1 * | 12/2021 | Bakshi | G06F 11/3692 |
| 2022/0012168 A1 * | 1/2022 | Challa | G06F 11/3684 |
| 2022/0308990 A1 * | 9/2022 | DeLuca | G06F 11/0793 |
| 2023/0008218 A1 * | 1/2023 | Marinescu | G06Q 10/06316 |
| 2023/0325298 A1 * | 10/2023 | Mohan | G06F 11/3684 717/126 |

(Continued)

FOREIGN PATENT DOCUMENTS

| | | |
|---|---|---|
| CN | 114090462 A * | 2/2022 |
| CN | 114185806 A * | 3/2022 |

(Continued)

OTHER PUBLICATIONS

Oscar Chaparro, Assessing the Quality of the Steps to Reproduce in Bug Reports, 2019, pp. 1-11. https://dl.acm.org/doi/10.1145/3338906.3338947 (Year: 2019) (Year: 2019).*

(Continued)

*Primary Examiner* — Mongbao Nguyen
(74) *Attorney, Agent, or Firm* — Jackson Walker L.L.P.

(57) ABSTRACT

An information handling system may include at least one processor and a non-transitory, computer-readable medium having instructions thereon that are executable by the at least one processor for: receiving information regarding a software defect, wherein the information regarding the software defect includes a description of one or more steps usable to reproduce the defect; determining a plurality of keywords based on the description of the one or more steps; and accessing a database to determine one or more executable commands corresponding to each of the one or more steps.

12 Claims, 4 Drawing Sheets

(56) References Cited

U.S. PATENT DOCUMENTS

2023/0367700 A1* 11/2023 Yan ..................... G06F 11/366

FOREIGN PATENT DOCUMENTS

| CN | 114357442 A | * | 4/2022 | | |
| RU | 2701090 C1 | * | 9/2019 | .............. | G06F 11/00 |

OTHER PUBLICATIONS

David A. Tomassi, BugSwarm: Mining and Continuously Growing a Dataset of Reproducible Failures and Fixes, 2019, pp. 1-11. https://ieeexplore.ieee.org/stamp/stamp.jsp?tp=&arnumber=8812141 (Year: 2019).*

Robert O'Callahan, To Catch a Failure: The Record-and-Replay Approach to Debugging, 2020, p. 1-7. https://dl.acm.org/doi/pdf/10.1145/3386277 (Year: 2020).*

English translation Yang (CN-114090462-A), 2022, pp. 1-11. (Year: 2022).*

English translation Qin (CN-114185806-A), 2022, pp. 1-15. (Year: 2022).*

* cited by examiner

DEFECT RECREATION

TECHNICAL FIELD

The present disclosure relates in general to information handling systems, and more particularly to the re-creation and analysis of defects such as software bugs in information handling systems.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Defects such as bugs often arise in software systems. In order to fix these defects, it is useful to be able to reproduce or re-create them in order to perform a root-cause analysis. However, existing techniques for defect recreation are generally time-consuming, manual activities. Further, sometimes defects are intermittent or non-deterministic, and so they may not reliably occur when a technician attempts to recreate them.

Defect recreation also may require recreation of the specific environment in which the defect originally occurred. Manually setting up such an environment also consumes significant time. Further, the act of recreating a defect can itself be prone to human error.

Embodiments of this disclosure provide improved techniques for recreation and analysis of defects. In particular, embodiments may save time and effort that would otherwise be spent in manual defect recreation. Embodiments may easily and efficiently reproduce defects for a desired number of iterations, allowing location of intermittent defects. Embodiments may also be used in preliminary analysis, allowing for automatic rejection of defects that are non-reproducible. Embodiments may also be used for automatic generation of test cases to verify that a defect has been corrected.

Some embodiments of this disclosure may employ artificial intelligence (AI) techniques such as machine learning, deep learning, natural language processing (NLP), etc. Generally speaking, machine learning encompasses a branch of data science that emphasizes methods for enabling information handling systems to construct analytic models that use algorithms that learn interactively from data. It is noted that, although disclosed subject matter may be illustrated and/or described in the context of a particular AI paradigm, such a system, method, architecture, or application is not limited to those particular techniques and may encompass one or more other AI solutions.

It should be noted that the discussion of a technique in the Background section of this disclosure does not constitute an admission of prior-art status. No such admissions are made herein, unless clearly and unambiguously identified as such.

SUMMARY

In accordance with the teachings of the present disclosure, the disadvantages and problems associated with defect recreation may be reduced or eliminated.

In accordance with embodiments of the present disclosure, an information handling system may include at least one processor and a non-transitory, computer-readable medium having instructions thereon that are executable by the at least one processor for: receiving information regarding a software defect, wherein the information regarding the software defect includes a description of one or more steps usable to reproduce the defect; determining a plurality of keywords based on the description of the one or more steps; and accessing a database to determine one or more executable commands corresponding to each of the one or more steps.

In accordance with these and other embodiments of the present disclosure, a method may include an information handling system receiving information regarding a software defect, wherein the information regarding the software defect includes a description of one or more steps usable to reproduce the defect; the information handling system determining a plurality of keywords based on the description of the one or more steps; and the information handling system accessing a database to determine one or more executable commands corresponding to each of the one or more steps.

In accordance with these and other embodiments of the present disclosure, an article of manufacture may include a non-transitory, computer-readable medium having computer-executable code thereon that is executable by a processor of an information handling system for: receiving information regarding a software defect, wherein the information regarding the software defect includes a description of one or more steps usable to reproduce the defect; determining a plurality of keywords based on the description of the one or more steps; and accessing a database to determine one or more executable commands corresponding to each of the one or more steps.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Preferred embodiments and their advantages are best understood by reference to FIGS. 1 through 5, wherein like numbers are used to indicate like and corresponding parts.

For the purposes of this disclosure, the term "information handling system" may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

For purposes of this disclosure, when two or more elements are referred to as "coupled" to one another, such term indicates that such two or more elements are in electronic communication or mechanical communication, as applicable, whether connected directly or indirectly, with or without intervening elements.

When two or more elements are referred to as "coupleable" to one another, such term indicates that they are capable of being coupled together.

For the purposes of this disclosure, the term "computer-readable medium" (e.g., transitory or non-transitory computer-readable medium) may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; communications media such as wires, optical fibers, microwaves, radio waves, and other electromagnetic and/or optical carriers; and/or any combination of the foregoing.

For the purposes of this disclosure, the term "information handling resource" may broadly refer to any component system, device, or apparatus of an information handling system, including without limitation processors, service processors, basic input/output systems, buses, memories, I/O devices and/or interfaces, storage resources, network interfaces, motherboards, and/or any other components and/or elements of an information handling system.

Figure 1:
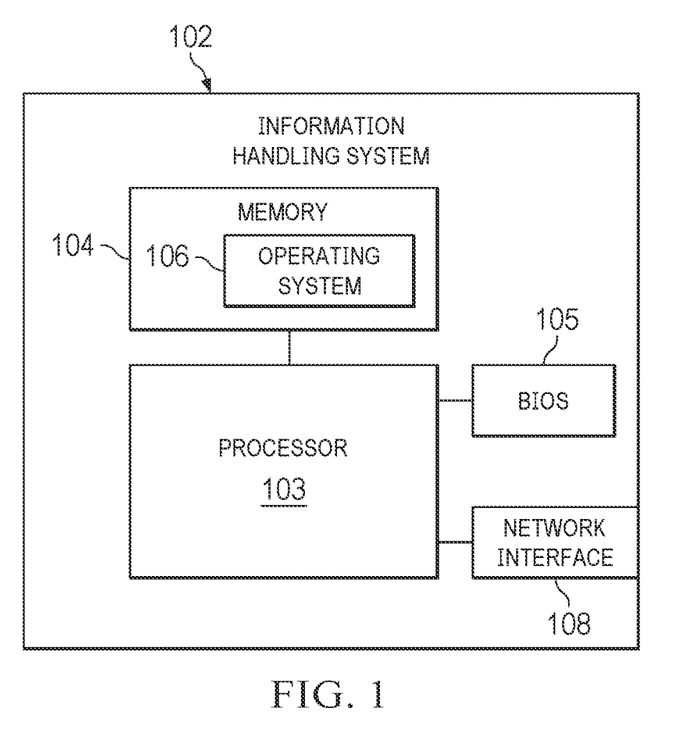
FIG. 1 illustrates a block diagram of an example information handling system, in accordance with embodiments of the present disclosure.

FIG. 1 illustrates a block diagram of an example information handling system 102, in accordance with embodiments of the present disclosure. In some embodiments, information handling system 102 may comprise a server chassis configured to house a plurality of servers or "blades." In other embodiments, information handling system 102 may comprise a personal computer (e.g., a desktop computer, laptop computer, mobile computer, and/or notebook computer). In yet other embodiments, information handling system 102 may comprise a storage enclosure configured to house a plurality of physical disk drives and/or other computer-readable media for storing data (which may generally be referred to as "physical storage resources"). As shown in FIG. 1, information handling system 102 may comprise a processor 103, a memory 104 communicatively coupled to processor 103, a BIOS 105 (e.g., a UEFI BIOS) communicatively coupled to processor 103, a network interface 108 communicatively coupled to processor 103. In addition to the elements explicitly shown and described, information handling system 102 may include one or more other information handling resources.

Processor 103 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104 and/or another component of information handling system 102.

Memory 104 may be communicatively coupled to processor 103 and may include any system, device, or apparatus configured to retain program instructions and/or data for a period of time (e.g., computer-readable media). Memory 104 may include RAM, EEPROM, a PCMCIA card, flash memory, magnetic 30 storage, opto-magnetic storage, or any suitable selection and/or array of volatile and/or non-volatile memory that retains data after power to information handling system 102 is turned off.

As shown in FIG. 1, memory 104 may have stored thereon an operating system 106. Operating system 106 may comprise any program of executable instructions (or aggregation of programs of executable instructions) configured to manage and/or control the allocation and usage of hardware resources such as memory, processor time, disk space, and input and output devices, and provide an interface between such hardware resources and application programs hosted by operating system 106. In addition, operating system 106 may include all or a portion of a network stack for network communication via a network interface (e.g., network interface 108 for communication over a data network). Although operating system 106 is shown in FIG. 1 as stored in memory 104, in some embodiments operating system 106 may be stored in storage media accessible to processor 103, and active portions of operating system 106 may be transferred from such storage media to memory 104 for execution by processor 103.

Network interface 108 may comprise one or more suitable systems, apparatuses, or devices operable to serve as an interface between information handling system 102 and one or more other information handling systems via an in-band network. Network interface 108 may enable information handling system 102 to communicate using any suitable transmission protocol and/or standard. In these and other embodiments, network interface 108 may comprise a network interface card, or "NIC." In these and other embodiments, network interface 108 may be enabled as a local area network (LAN)-on-motherboard (LOM) card.

As discussed above, embodiments may be employed to automate the recreation of defects such as software bugs in information handling systems such as information handling system 102. In some situations, this may be accomplished based on a "defect ticket" in which a user reports the defect and other relevant information to support personnel.

Figure 2:
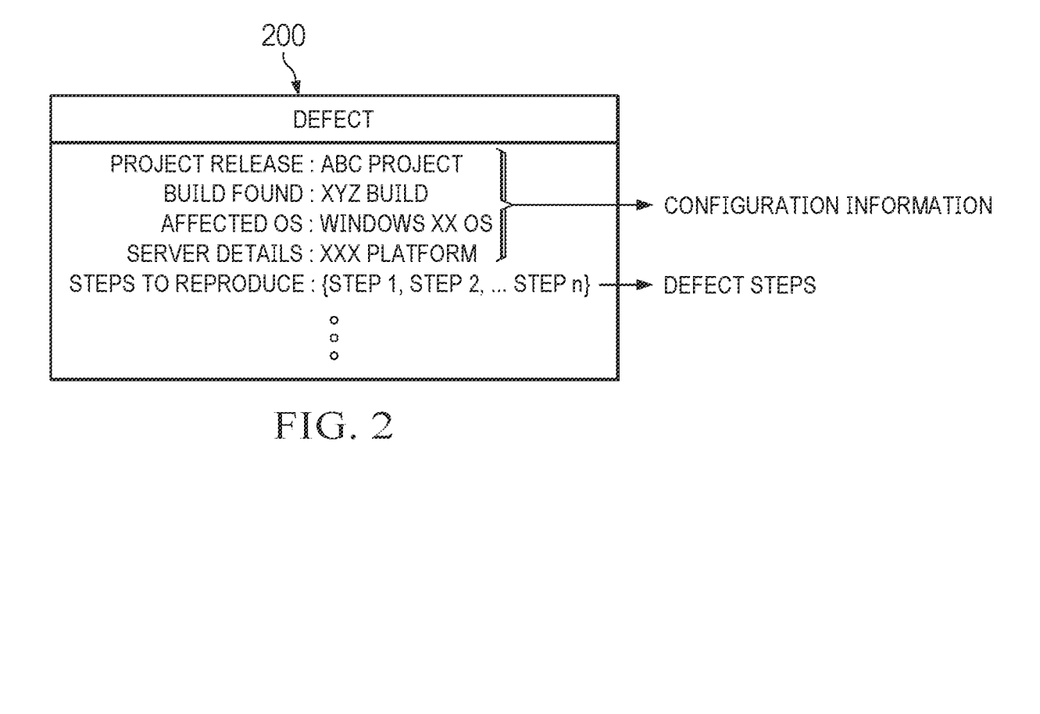
FIG. 2 illustrates an example defect ticket, in accordance with embodiments of the present disclosure.

FIG. 2 illustrates an example defect ticket 200, in accordance with some embodiments. In many cases, the information regarding a reported defect may be considered to have two major components: (1) the configuration (also referred to herein as the environment) in which it occurred, and (2) the set of steps that led to the occurrence of the defect. As one of ordinary skill in the art with the benefit of this disclosure will appreciate, a defect ticket may include configuration information such as the operating system (OS) on which the defect was observed, relevant software versions, build information, etc. The defect ticket may also include information regarding the steps that lead to the defect occurring, as well as any other relevant information.

The steps described in the defect ticket may be parsed automatically as described in more detail below (e.g., by using NLP or other suitable techniques) in order to extract the important data. In one embodiment, a database may be implemented that allows for a given step (e.g., as described in natural language in a defect ticket) to be associated with one or more particular commands (e.g., commands that are executable by an information handling system). In other embodiments, different types of data structure (e.g., a list, a hashmap, etc.) may also be used; for purposes of this disclosure, the term "database" should be understood to include such other suitable data structures.

Each step in a ticket may typically include one or more keywords that indicate some action. For example, a ticket may include a step such as "install product XYZ version abc" as a specified action in the list of steps that led to the defect. The keywords may be extracted as {"install", "XYZ", "version", "abc"}.

Each command derived from such an action may comprise a statement which can be executed (e.g., via a command line interface in some embodiments) to carry out the action to which it is mapped. For the example above, a possible command might be determined to be "./XYZ_abc_setup.sh".

In some embodiments, the steps included in a defect ticket may be written in natural language (e.g., English sentences or phrases). Accordingly, NLP techniques may be used derive a set of one or more keywords form each step. Then the most suitable matching command for that step may be determined by consulting the database mentioned above. When appropriate, multiple commands may then be placed one after another to create an automated script, and the defect can be reproduced by invoking the script (e.g., by executing it at a command line).

Figure 3:
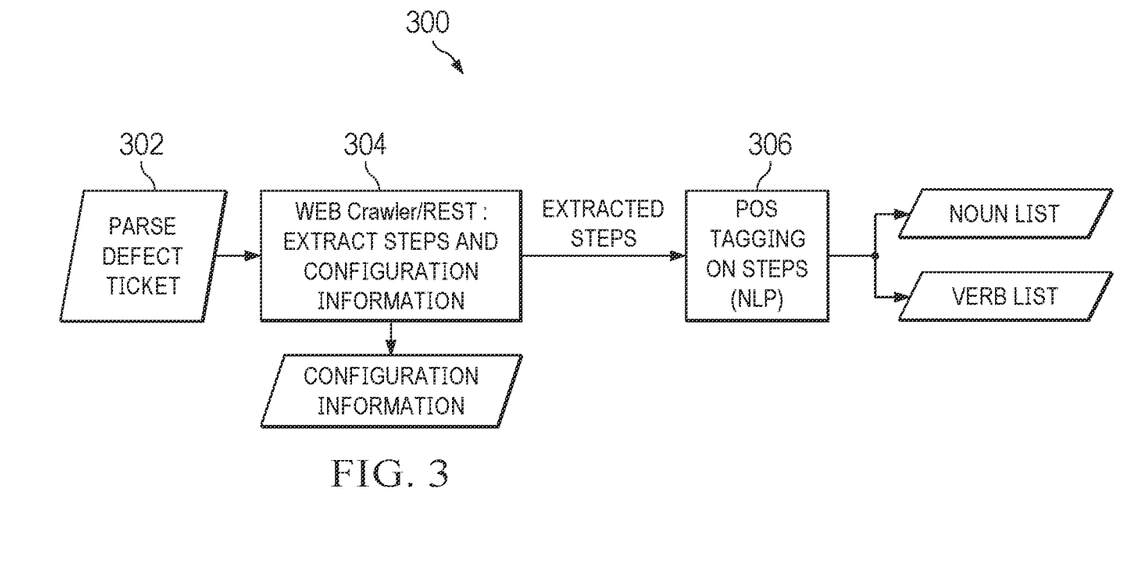
FIGS. 3-5 illustrate example methods, in accordance with embodiments of the present disclosure.

FIG. 3 illustrates an example method 300 for creating a database associating defect ticket steps to commands, according to some embodiments. First, one or more defect tickets may be parsed at step 302 to extract the relevant information (e.g., environment information and reproduction steps). A web crawler and/or an application programming interface (API) such as a REST API of the ticketing system may be employed for this task at step 304.

The environment/configuration information in a defect ticket is typically associated with one or more designated fields (e.g., affected OS, software build version, etc.). Accordingly, such information may often be extracted directly (e.g., by accessing an API of the ticketing system, reading a file associated with the ticket, etc.) without the need for NLP in such instances.

For the reproduction steps, parts-of-speech (POS) tagging may be applied to each of the step in a ticket at step 306 in order to tag all of the parts of speech. For example, nouns (which typically pertain to information such as the name of a product, platform, software, feature, etc.) may be tracked in a noun list. Verbs (which typically pertain to actions like install, create, run, invoke, etc.) may be tracked in a verb list.

As another example of a step that might appear in a defect ticket, a ticket might include a step such as "Install iSM 4.1 build 2350 on windows host OS." (iSM refers to a Dell® tool known as iDRAC Service Module.) POS tagging may be used to parse this step as follows:

Install: Verb
iSM: Noun
4.1: Number
build: Verb
2350: Number
on: Preposition
windows: Noun (plural)
host: Noun
OS: Noun Further, heuristics may be implemented to allow for combining multiple terms into a group, such as determining that "iSM" and "4.1" are part of a single entity, as are "build" and "2350".

In this example, the verb list may consist of {"Install"}, while the noun list may consist of {"iSM 4.1", "build 2350", "Windows", "Host", "OS"}. The configuration information may include whatever information the ticket indicates, such as a particular OS version, etc. The database may then be searched for entries associated with the combination of this verb list, this noun list, and this configuration information, and one or more commands may be determined. For example, in this situation, the desired commands may be determined as:

1. scp <ism4.1installer> <testmachine path>
2. msiexec /i <path to ism4.1 installer on test machine>

In some situations, steps that are in fact similar or identical may not always be worded identically. NLP techniques may be used to avoid duplicated database entries in such situations, as well as providing a mechanism for conflict resolution when similar entries are present. For example, text similarity scores may be calculated to determine whether two apparently different steps actually correspond to the same command(s).

In some embodiments, NLP techniques may also be used to handle typographical errors in a defect ticket. For example, certain types of errors (e.g., a typographical error in an ordinary word) may be caught by a standard spell checker. Other errors (e.g., a typographical error in a term of art such as an acronym for a product) may be more difficult to resolve. However, the context for a step is effectively captured by the combination of noun+verb+configuration information. Given that context, NLP techniques may be used to resolve ambiguous or erroneous text.

Figure 4:
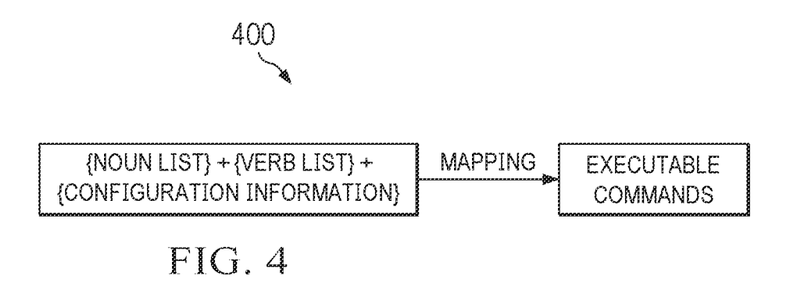

FIG. 4 illustrates an example method 400 for combining the information derived in method 300 and creating a mapping to executable commands, in some embodiments.

In some instances, a combination of a noun (e.g., name of software, feature, etc.), a verb (e.g., run, install, etc.), and a set of configuration information (e.g., OS info, build numbers, etc.) may be combined and mapped to an executable command. This mapping may be created programmatically and/or with the help of a human expert. As new features and test cases are implemented, the database may be maintained, with new commands being added incrementally as needed.

Figure 5:
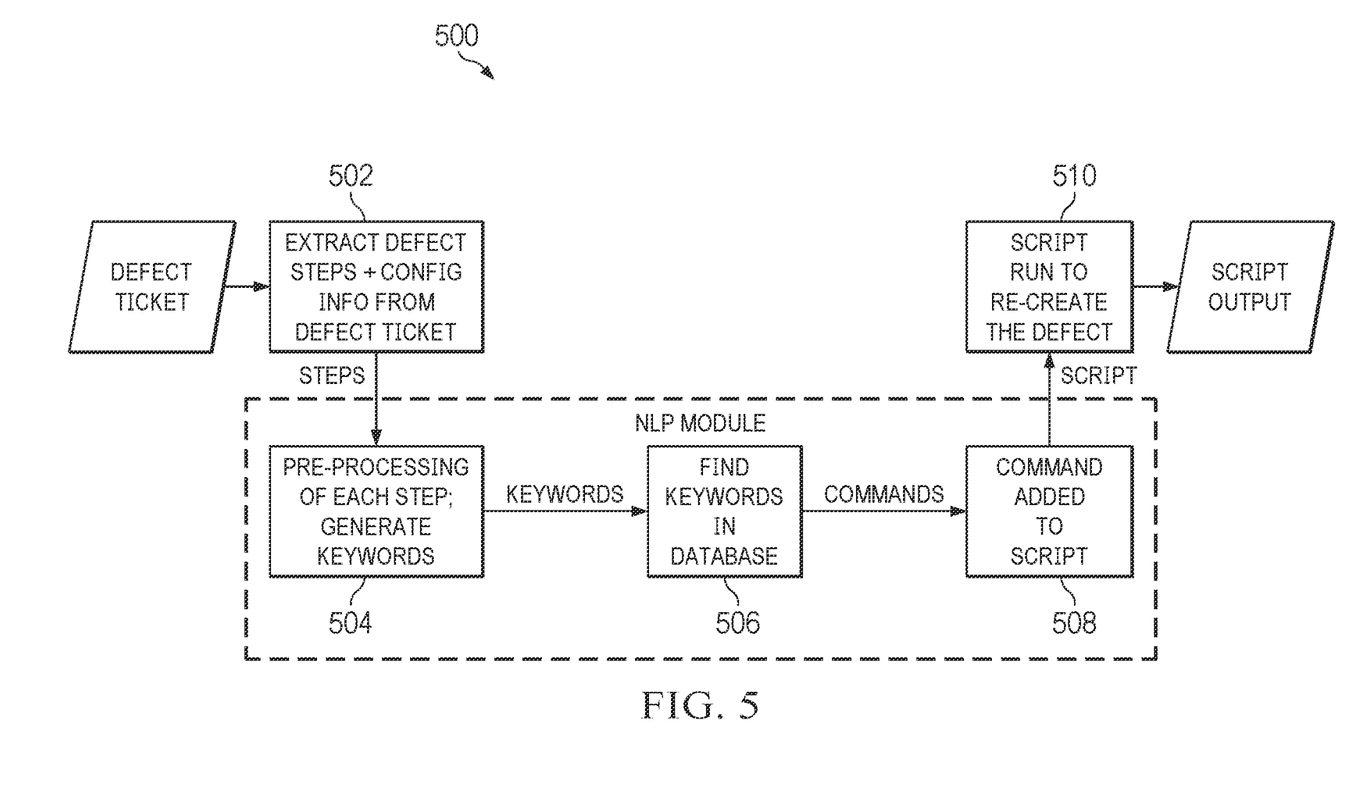

FIG. 5 illustrates an example method 500 for defect recreation, according to some embodiments. In particular, method 500 may be used to build a script that can be executed to recreate the defect. An empty script may be instantiated at the outset, and it may be built up in stages as described herein.

At step 502, the defect steps and configuration information may be extracted from the ticket as described above.

At step 504, each step may be processed (e.g., using POS tagging) to extract keywords (e.g., the nouns and verbs) from the defect step. At step 506, a combination of the nouns, verbs, and configuration information may be used to find a matching entry in the database, allowing the correct command to be selected for each step.

In some situations, it is possible that an exact match may not be found in the database. For handling such anomalies, method 500 may look for synonyms of the verb to determine possible matches. As the verbs in this problem context are typically normal words (e.g., English words), NLP techniques may be used to find synonymous words. These synonyms may be added to the database in some embodiments so that subsequent searches may find a match more easily.

Once a match is found in the database, the corresponding command may be added to the script at step 508.

This process may be repeated for each defect step found in the defect ticket, building up the full script iteratively. At step 510, the script may be executed to recreate the defect. The output of this script may also be analyzed to see if the defect occurred as expected.

One of ordinary skill in the art with the benefit of this disclosure will understand that the preferred initialization points for the methods depicted in FIGS. 3-5 and the order of the steps comprising those methods may depend on the implementation chosen. In these and other embodiments, the methods may be implemented as hardware, firmware, software, applications, functions, libraries, or other instructions. Further, although FIGS. 3-5 disclose a particular number of steps to be taken with respect to the disclosed methods, the methods may be executed with greater or fewer steps than depicted. The methods may be implemented using any of the various components disclosed herein (such as the components of FIG. 1), and/or any other system operable to implement the methods.

Although various possible advantages with respect to embodiments of this disclosure have been described, one of ordinary skill in the art with the benefit of this disclosure will understand that in any particular embodiment, not all of such advantages may be applicable. In any particular embodiment, some, all, or even none of the listed advantages may apply.

This disclosure encompasses all changes, substitutions, variations, alterations, and modifications to the exemplary embodiments herein that a person having ordinary skill in the art would comprehend. Similarly, where appropriate, the appended claims encompass all changes, substitutions, variations, alterations, and modifications to the exemplary embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

Unless otherwise specifically noted, articles depicted in the drawings are not necessarily drawn to scale. However, in some embodiments, articles depicted in the drawings may be to scale.

Further, reciting in the appended claims that a structure is "configured to" or "operable to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke § 112(f) during prosecution, Applicant will recite claim elements using the "means for [performing a function]" construct.

All examples and conditional language recited herein are intended for pedagogical objects to aid the reader in understanding the invention and the concepts contributed by the inventor to furthering the art, and are construed as being without limitation to such specifically recited examples and conditions. Although embodiments of the present inventions have been described in detail, it should be understood that various changes, substitutions, and alterations could be made hereto without departing from the spirit and scope of the disclosure.

What is claimed is:

1. An information handling system comprising:
   at least one processor; and
   a non-transitory, computer-readable medium having instructions thereon that are executable by the at least one processor for:
   receiving information regarding a software defect, wherein the information regarding the software defect includes environment information indicative of an environment associated with an occurrence of the defect and a description of one or more steps usable to reproduce the defect, and wherein the defect is an intermittent defect that does not occur reliably;
   determining a plurality of keywords based on the environment information and the description of the one or more steps;
   accessing a database to determine one or more executable commands corresponding to each of the one or more steps;
   generating an executable script based on the one or more executable commands, wherein the executable script is configured to re-create the environment associated with the occurrence of the defect and the one or more steps usable to reproduce the defect to reproduce the defect;
   receiving information regarding a user-selectable number of iterations for reproduction of intermittent defects; and
   executing the executable script repeatedly for the user-selectable number of iterations to reproduce the intermittent defect.

2. The information handling system of claim 1, wherein the information regarding the software defect is a defect ticket of a defect tracking system.

3. The information handling system of claim 1, wherein determining the plurality of keywords comprises performing natural language processing (NLP).

4. The information handling system of claim 3, wherein performing the NLP further comprises determining a synonym for at least one of the keywords.

5. A method comprising:
an information handling system receiving information regarding a software defect, wherein the information regarding the software defect includes environment information indicative of an environment associated with an occurrence of the defect and a description of one or more steps usable to reproduce the defect, and wherein the defect is an intermittent defect that does not occur reliably;
the information handling system determining a plurality of keywords based on the environment information and the description of the one or more steps;
the information handling system accessing a database to determine one or more executable commands corresponding to each of the one or more steps;
the information handling system generating an executable script based on the one or more executable commands, wherein the executable script is configured to re-create the environment associated with the occurrence of the defect and the one or more steps usable to reproduce the defect to reproduce the defect;
receiving information regarding a user-selectable number of iterations for reproduction of intermittent defects; and
executing the executable script repeatedly for the user-selectable number of iterations to reproduce the intermittent defect.

6. The method of claim 5, wherein the information regarding the software defect is a defect ticket of a defect tracking system.

7. The method of claim 5, wherein determining the plurality of keywords comprises performing natural language processing (NLP).

8. The method of claim 7, wherein performing the NLP further comprises determining a synonym for at least one of the keywords.

9. An article of manufacture comprising a non-transitory, computer-readable medium having computer-executable code thereon that is executable by a processor of an information handling system for:
receiving information regarding a software defect, wherein the information regarding the software defect includes environment information indicative of an environment associated with an occurrence of the defect and a description of one or more steps usable to reproduce the defect, and wherein the defect is an intermittent defect that does not occur reliably;
determining a plurality of keywords based on the description of the environment information and the one or more steps;
accessing a database to determine one or more executable commands corresponding to each of the one or more steps;
generating an executable script based on the one or more executable commands, wherein the executable script is configured to re-create the environment associated with the occurrence of the defect and the one or more steps usable to reproduce the defect to reproduce the defect;
receiving information regarding a user-selectable number of iterations for reproduction of intermittent defects; and
executing the executable script repeatedly for the user-selectable number of iterations to reproduce the intermittent defect.

10. The article of claim 9, wherein the information regarding the software defect is a defect ticket of a defect tracking system.

11. The article of claim 9, wherein determining the plurality of keywords comprises performing natural language processing (NLP).

12. The article of claim 11, wherein performing the NLP further comprises determining a synonym for at least one of the keywords.

* * * * *